(12) United States Patent
Sabic

(10) Patent No.: US 10,748,445 B2
(45) Date of Patent: Aug. 18, 2020

(54) AUTOMATED NUTRITION ANALYTICS SYSTEMS AND METHODS

(71) Applicant: Pagokids, LLC, St. Louis, MO (US)

(72) Inventor: Adnan Sabic, St. Louis, MO (US)

(73) Assignee: Pagokids, LLC, St. Louis, MO (US)

( * ) Notice: Subject to any disclaimer, the term of this patent is extended or adjusted under 35 U.S.C. 154(b) by 0 days.

(21) Appl. No.: 16/033,784

(22) Filed: Jul. 12, 2018

(65) Prior Publication Data

US 2019/0385478 A1 Dec. 19, 2019

Related U.S. Application Data

(60) Provisional application No. 62/531,437, filed on Jul. 12, 2017.

(51) Int. Cl.
*G09B 19/00* (2006.01)
*G06F 3/16* (2006.01)
*G06F 3/0484* (2013.01)

(52) U.S. Cl.
CPC ..... *G09B 19/0092* (2013.01); *G06F 3/04842* (2013.01); *G06F 3/167* (2013.01)

(58) Field of Classification Search
CPC ........ G06Q 10/00; G06Q 30/00; G09B 19/00; G06F 3/048
See application file for complete search history.

(56) References Cited

U.S. PATENT DOCUMENTS

| | | | | |
|---|---|---|---|---|
| 2005/0272493 A1* | 12/2005 | Bermudez | ........... | A63F 3/00643 463/1 |
| 2006/0058586 A1* | 3/2006 | Humble | .............. | G06F 19/3475 600/300 |
| 2010/0075745 A1* | 3/2010 | Gomez | ................... | G07F 17/32 463/25 |
| 2011/0087076 A1* | 4/2011 | Brynelsen | ............. | A61B 5/1118 600/300 |
| 2013/0132319 A1* | 5/2013 | Landers | ................... | G06N 5/02 706/46 |
| 2013/0218511 A1* | 8/2013 | Mager | ................ | G01G 23/3735 702/129 |
| 2013/0335418 A1* | 12/2013 | Kim | ....................... | G06Q 10/00 345/424 |
| 2014/0279211 A1* | 9/2014 | Bruber | ............... | G06Q 50/2053 705/26.8 |
| 2015/0262506 A1* | 9/2015 | Vassallo | ............. | G09B 19/0092 434/127 |
| 2015/0379892 A1* | 12/2015 | Sako | ................... | G06F 19/3475 434/127 |

(Continued)

OTHER PUBLICATIONS

"Three quarters empty or one quarter full", internet document, dated Apr. 9, 2017.*

*Primary Examiner* — Li P Sun
*Assistant Examiner* — Qi Wan
(74) *Attorney, Agent, or Firm* — Stinson LLP

(57) ABSTRACT

Automated food item consumption and nutrition tracking and analytics. By providing closed-form visual food item consumption data entry generally contemporaneously with food item consumption, nutrition characteristics of the consumed food items are analyzed to compile reports and identify trends. A reporting service generates reports of food item consumption and associated nutrition intake for distribution to computing devices via a communications network.

11 Claims, 21 Drawing Sheets

(56) References Cited

U.S. PATENT DOCUMENTS

| | | | | |
|---|---|---|---|---|
| 2016/0035248 A1* | 2/2016 | Gibbs | ................... | G06T 7/0002 |
| | | | | 434/127 |
| 2016/0379520 A1* | 12/2016 | Borel | ................. | G09B 19/0092 |
| | | | | 434/127 |
| 2017/0148162 A1* | 5/2017 | Kang | ................. | G06K 9/00671 |
| 2017/0220772 A1* | 8/2017 | Vleugels | ................ | G16H 20/60 |

* cited by examiner

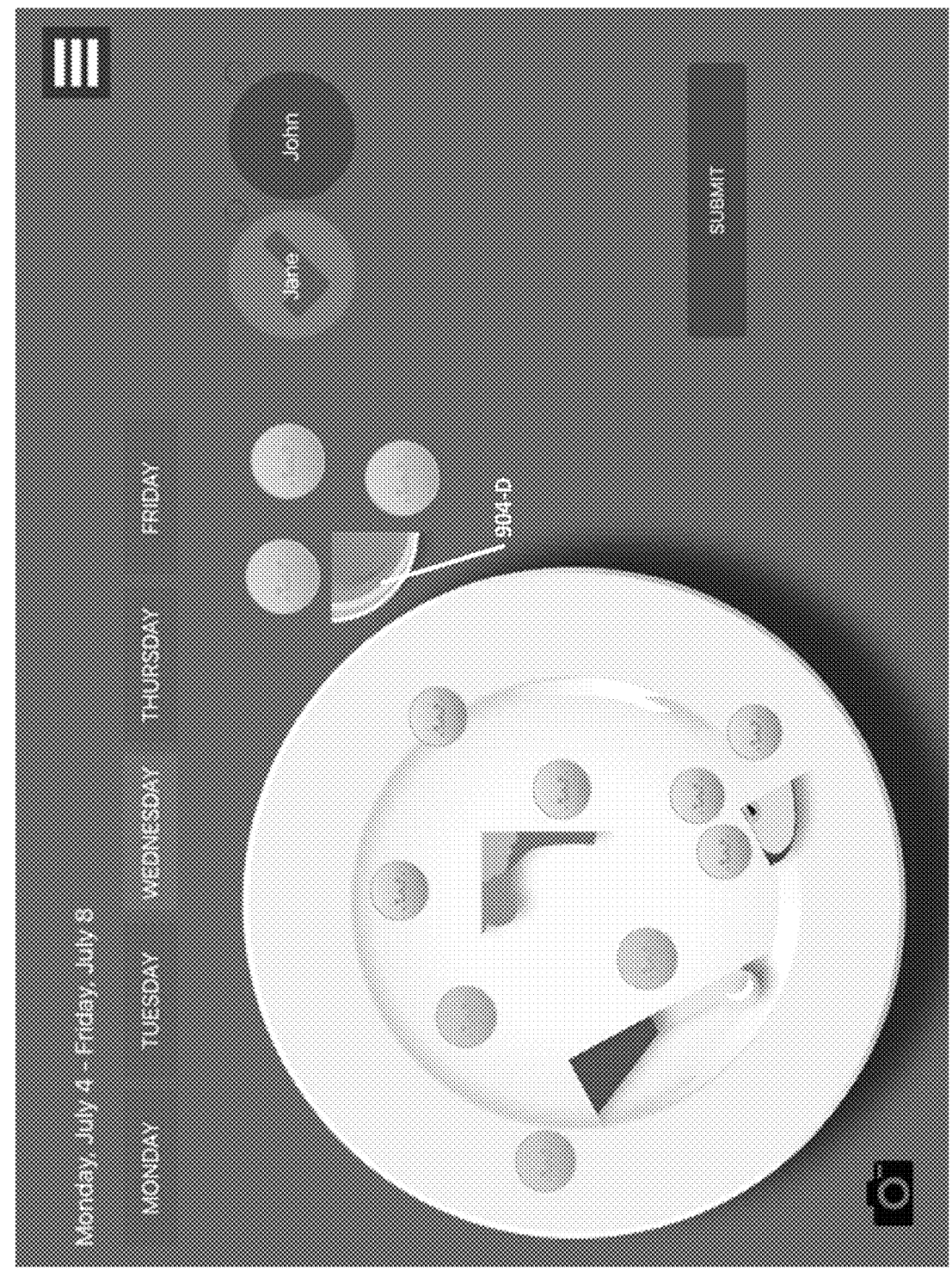

AUTOMATED NUTRITION ANALYTICS SYSTEMS AND METHODS

CROSS-REFERENCE TO RELATED APPLICATIONS

This application claims benefit of U.S. provisional application Ser. No. 62/531,437, filed Jul. 12, 2017, the entire disclosure of which is incorporated herein by reference.

FIELD OF THE INVENTION

Various aspects of the present invention generally relate to the fields of networked computerized nutrition tracking and analytics systems utilized to log, analyze, and display nutrition data.

BACKGROUND

Typical nutrition tracking processes require detailed input regarding the amount of food intake for each participant. Data entry for these processes is often free-form in nature, time-consuming, error-prone, and cannot be completed in temporal proximity to the food consumption. For example, a food item consumed by a participant must be written down, typed out, or selected from a large collection of available food items. Moreover, a determination of the amount of the food item consumed must be recorded in order to correctly determine nutrition intake from the consumed food items. Many existing processes utilize measurements in grams, ounces, government-recommended serving sizes, and the like. Obtaining the correct amount of food item consumption is thus cumbersome, often inaccurate, and/or requires measuring use of devices such as scales or measuring cups.

These problems with current approaches to nutrition tracking are further compounded when rapid data entry of food intake for several participants is needed. For example, in order to track food intake of a group of students, a teacher or aid needs an efficient data entry system that minimize the amount of time diverted from class instruction. Thus, there remains a need for nutrition tracking and analytics systems having improved data entry capabilities.

SUMMARY

Aspects of the invention provide closed-form visual food item and/or beverage item consumption data entry systems and methods. By utilizing a predetermined menu and a visual display of menu food items, aspects of the invention enable quick and accurate data entry of food item consumption generally contemporaneously with food consumption. Aspects of the invention also provide automated food item consumption tracking, nutrition analytics, and food item consumption and nutrition report generation and distribution.

In an aspect, a method includes displaying a first graphical indicia of a food item on a graphical user interface of a computing device. The first indicia corresponds to a first state of the food item and an item state counter. The item state counter has a first value stored in a memory of the computing device. The computing device receives a selection of the displayed first graphical indicia of the food item via the graphical user interface. The computing device increments the item state counter stored in the memory device from the first value to a second value. The second value corresponds to a second state of the food item and to a second graphical indicia of the food item. The computing device stores data corresponding to the second value in the memory storage device. The second value indicates the food item has been transformed by consumption from the first state to the second state. The computing device displays the second graphical indicia of the food item on the graphical user interface.

In another aspect, a system includes a server computing device, a nutrition tracking input computing device, and a nutrition tracking display computing device connected by a communications network. The server computing device includes a database, an analytics service, and a report generator. The database is configured to store nutritional data and food consumption data. The analytics service is configured to analyze the stored data, detect patterns in the stored data, and record trends about actual food item consumption and nutrition. The report generator is configured to retrieve the stored data, generate reports that include information about the detected patterns, store the generated reports in the database, and transmit the generated reports via the communications network. The nutrition tracking input computing device is configured to provide a closed-form visual food item consumption data entry graphical user interface corresponding to one or more actual food items available to a participant. The nutrition tracking display computing device is configured to receive reports from the report generator via the communications network and display the received reports via a graphical user interface.

Other objects and features will be in part apparent and in part pointed out hereinafter.

BRIEF DESCRIPTION OF THE DRAWINGS

FIGS. 13A-13E illustrate an exemplary GUI 1300 displaying a GUI menu of GUI food items 904 including a GUI beverage item.

Corresponding reference characters indicate corresponding parts throughout the drawings.

DETAILED DESCRIPTION

Figure 1:
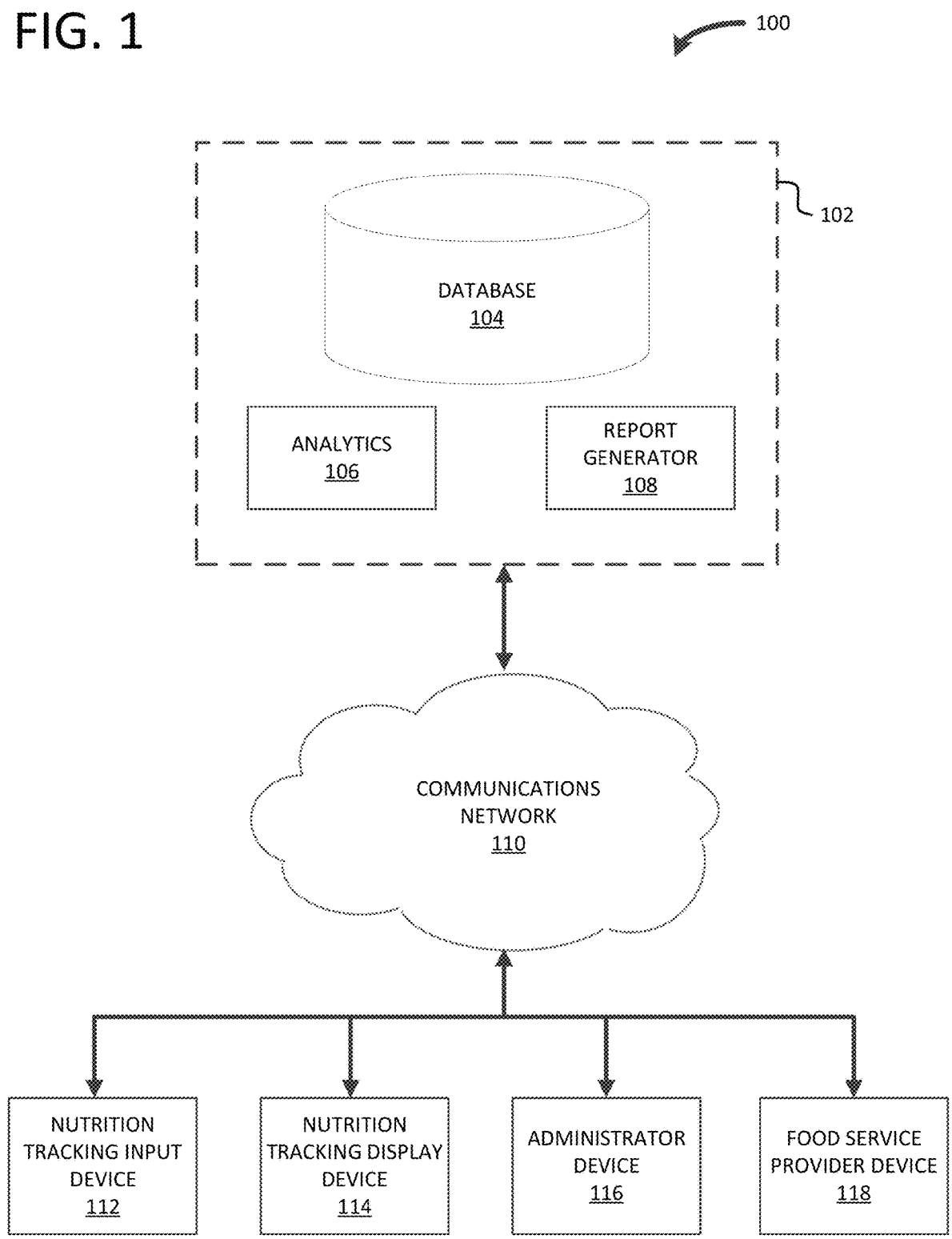
FIG. 1 illustrates an automated nutrition tracking and analytics system according to an embodiment of the invention.

Referring to FIG. 1, an automated nutrition tracking and analytics system, generally indicated at 100, provides a closed-form visual food item consumption data entry graphical user interface (GUI), analyzes the data stored in a database, and transforms that data into reports that are communicated to appropriate computing devices at appropriate times and manners. As used herein, food item includes any nutritious substance that can be consumed by eating (e.g., solids) or drinking (e.g., liquids). The system 100 includes a server computing device 102, a database 104, an analytics service 106, a report generator 108, a communications network 110, a nutrition tracking input device 112, a nutrition tracking display device 114, an administrator device 116, and a food service provider device 118. In an embodiment, aspects of system 100 enable a user (e.g., a teacher) to enter data about participants' (e.g., students') food consumption at the time of consumption, at which point aspects of system 100 autonomously upload the entered data to server computing device 102, analyze the data with analytics service 106 to determine nutrition consumption and associated trends for each participant, generate a report of the determined food and nutrition consumption for each participant with report generator 108, and transmit the generated reports to nutrition tracking display device 114. In an additional or alternative embodiment, the data and generated reports are stored on server computing device 102 for access by nutrition tracking input device 112, nutrition tracking display device 114, administrator device 116, and/or food service provider device 118 via communications network 110.

In an embodiment, the server computing device 102 is configured to store, in database 104 for example, various types of data related to food item consumption and associated nutrition. Exemplary data includes, but is not limited to, participant age, food item types, food item amounts, macronutrients, micronutrients, food items consumed, percentage of food items consumed, participant's ranking of food items consumed, and the like. Although illustrated as a single device in FIG. 1, one having ordinary skill in the art will understand that server computing device 102 may comprise a plurality of server computing devices connected via a communications network (e.g., a cloud environment).

The analytics service 106 is configured to analyze data stored in database 104, detect patterns in the stored data, and record trends about food item consumption and nutrition for future reference. In an embodiment, analytics service 106 comprises processor-executable instructions embodied on a storage memory device of server computing device 102 to provide analytics service 106 via a software environment. For example, analytics service 106 may be provided as processor-executable instructions that comprise a procedure, a function, a routine, a method, and/or a subprogram utilized independently or in conjunction with additional aspects of system 100 according to an exemplary embodiment of the invention.

The report generator 108 is configured to retrieve data from database 104, generate reports that include information about the detected patterns, store the generated reports in the report repository, such as database 104, and transmit the generated reports to computing devices (e.g., nutrition tracking display device 114) via the communications network 110. In an embodiment, report generator 108 comprises processor-executable instructions embodied on a storage memory device of server computing device 102 to provide report generator 108 via a software environment. For example, report generator 108 may be provided as processor-executable instructions that comprise a procedure, a function, a routine, a method, and/or a subprogram utilized independently or in conjunction with additional aspects of system 100 according to an exemplary embodiment of the invention. In an embodiment, report generator 108 transmits a report comprising a food journal to nutrition tracking display device 114 (e.g., utilized by a parent of a participant) by email and/or text message on a daily and/or weekly basis with an automated nutrition breakdown of food items consumed and enjoyed by the participant for identifying trends in the participant's eating habits.

The communications network 110 is capable of facilitating the exchange of data among various components of system 100. The communications network 110 in the embodiment of FIG. 1 includes a wide area network (WAN) that is connectable to other telecommunications networks, including other WANs or portions of the Internet or an intranet, including local area networks (LANs). The communications network 110 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 110 is any medium that allows data to be physically transferred through serial or parallel communication channels (e.g., copper wire, optical fiber, computer bus, wireless communication channel, etc.).

The nutrition tracking input device 112 is configured to provide a closed-form visual food item consumption data entry GUI. In an embodiment, nutrition tracking input device 112 is a mobile device having a touchscreen user interface, a processor, and a processor-readable storage medium storing processor-executable instructions comprising an application ("app") that, when executed by the processor, provide the closed-form visual food item consumption data entry GUI. For example, nutrition tracking input device 112 may be a workstation, a desktop computing device, a laptop computing device, a tablet computing device, a mobile device, a smartphone, a smartwatch, and the like. In an embodiment, the app serves as a food diary to connect parents (e.g., nutrition tracking display device 114), teachers (e.g., nutrition tracking input device 112), and healthcare professionals (e.g., administrator device 116) to present data regarding participant food item consumption, associated nutrition intake, and food item favorability. For example, the app may foster parent-child, teacher-child, and/or parent-teacher interaction and educational enhancement through experiential learning opportunities.

The nutrition tracking display device 114 and the administrator device 116 are each configured to provide access to data stored in database 104 and analyzed by analytics service 106 via communications network 110, receive reports from report generator 108 via communications network 110, and display the accessed data and received reports via a GUI. In an embodiment, nutrition tracking display device 114 is utilized by a parent of a participant to view food consumption trends and nutritional breakdowns of the participant. In another embodiment, administrator device 116 is utilized by a school administrator to view food consumption amounts and trends and associated nutritional breakdowns for the participants as a whole as well as for individual participants. In yet another embodiment, administrator device 116 is utilized to enter a menu of food items such that the menu is predetermined and does not need to be entered by a user via nutrition tracking input device 112. For example, nutrition tracking display device 114 and administrator device 116 may each be a workstation, a desktop computing device, a laptop computing device, a tablet computing device, a mobile device, a smartphone, a smartwatch, and the like. Additional exemplary embodiments of nutrition tracking display device 114 and administrator device 116 are provided herein.

The food service provider device 118 is configured to provide access to data stored in database 104 and analyzed by analytics service 106 via communications network 110 and receive food item orders via communications network 110. In an embodiment, food service provider device 118 is utilized by a food service provider, such as a catering company and/or a school cafeteria, to receive a menu of ordered food items. In another embodiment, food service provider device 118 is utilized by a dietician to review ordered food items and make recommendations about food item nutrition for participants individually or as a whole. For example, food service provider device 118 may be a workstation, a desktop computing device, a laptop computing device, a tablet computing device, a mobile device, a smartphone, a smartwatch, and the like.

Figure 2:
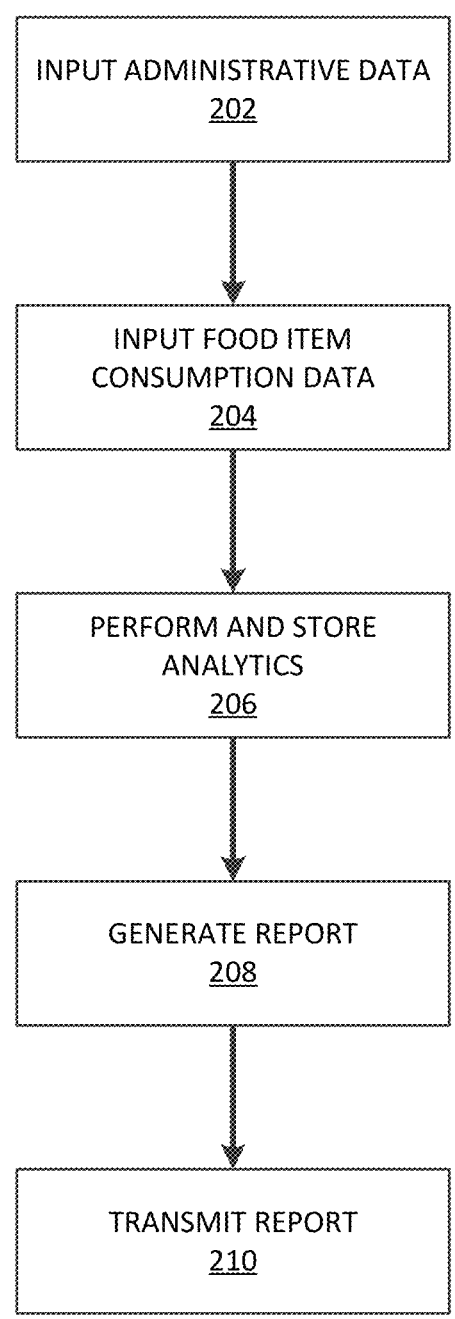
FIG. 2 illustrates an exemplary flow diagram illustrating an operation of the automated nutrition analytics system of FIG. 1.
Figure 6:
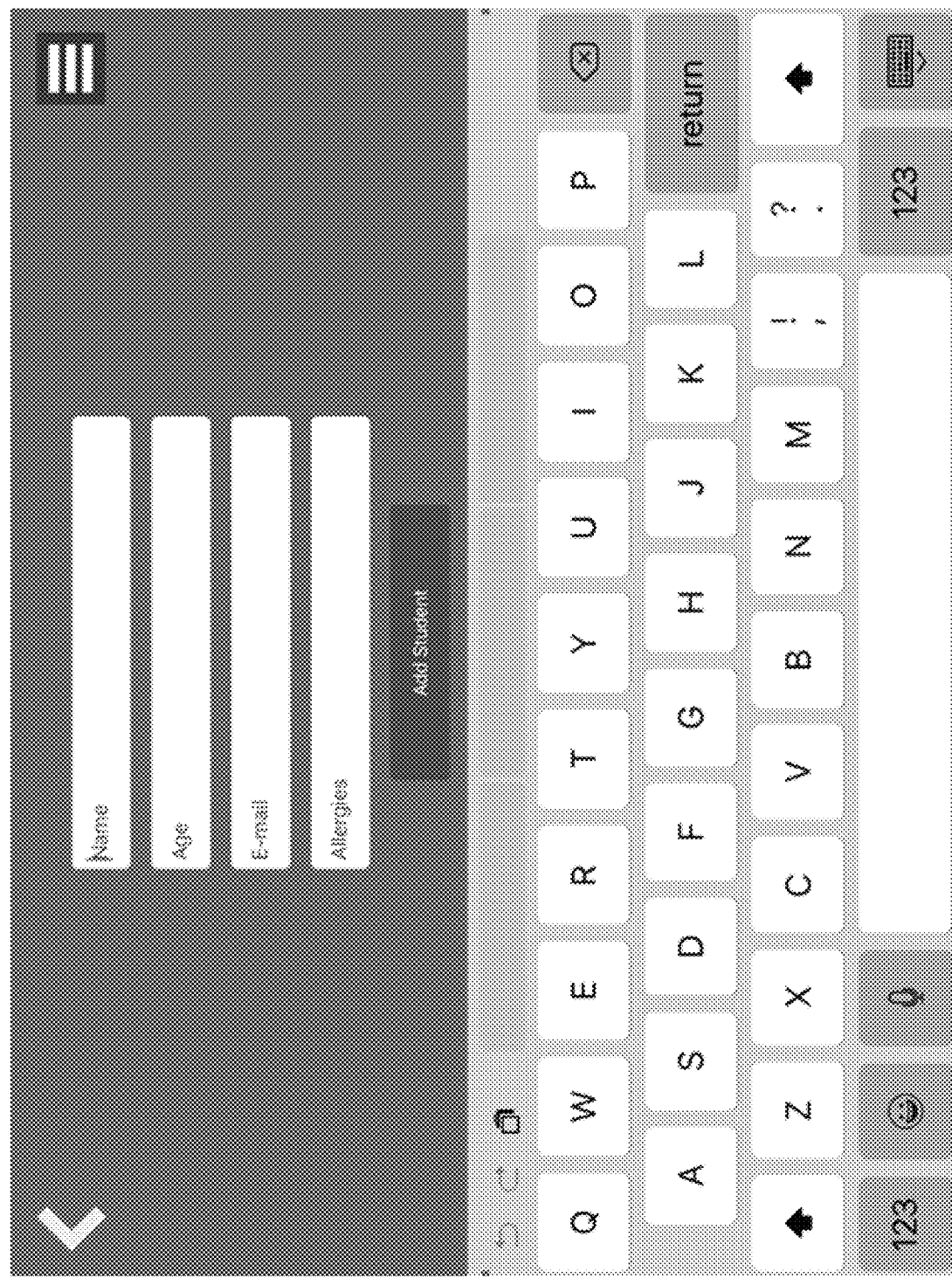
FIG. 6 illustrates an exemplary display of a new participant entry displayed by a graphical user interface according to an embodiment of the invention.

FIG. 2 illustrates an exemplary flow diagram in accordance with an aspect of the invention. At step 202 an administrator inputs administrative data on administrator device 116 and transmits it to database 104 via communications network 110. For example, administrator device 116 may display a GUI 600 as illustrated in FIG. 6 and receive data regarding a participant's name, age, associated e-mail address (e.g., for a parent/guardian), and allergies. In this manner, an entry and associated data for each participant is stored in database 104 before tracking the participant's food item consumption. As illustrated in FIG. 6, pressing on an "Add Student" button initiates a transmission of the inputted data from administrator device 116 to database 104 via communications network 110.

Referring to step 204 of FIG. 2, a user inputs food item consumption data on nutrition tracking input device 112 representing an amount of the food item consumed by a participant and transmits it to database 104 via communications network 110. For example, a nutrition tracking input device 112 may display a GUI 900 as illustrated in FIGS. 9A-9E and receive data regarding food item consumption by a participant. As used herein, food item consumption can also include beverage consumption. Further details regarding entry of food item consumption data are provided herein.

Referring again to FIG. 2, analytics service 106 analyzes the food item consumption data stored in database 104 for each participant. In an embodiment, analytics service 106 determines nutrition intake (e.g., micronutrients, macronutrients, etc.) based on the food item consumption data. The analytics service 106 also stores the analyzed data in database 104. At step 208 report generator 108 generates a report for each participant that includes administrative data, food item consumption data, and nutrition analytics data for the participant. Exemplary report types include, but are not limited to, text messages, emails, and the like. At step 210, server computing device 102 transmits the generated report to nutrition tracking display device 114, administrator device 116, and/or food service provider device 118 via communications network 110.

Figure 3:
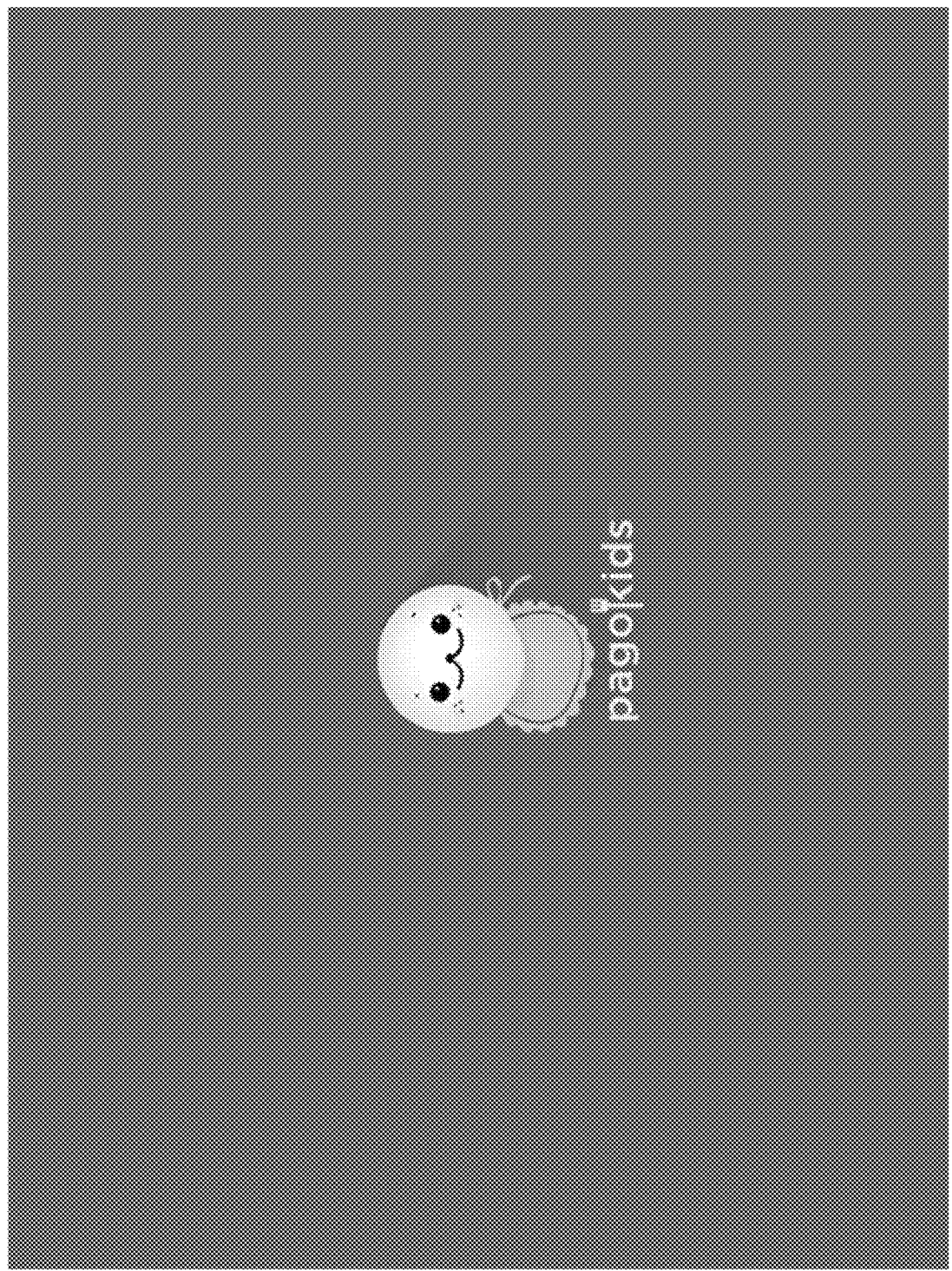
FIG. 3 illustrates an exemplary display of a splash screen displayed by a graphical user interface according to an embodiment of the invention.

FIG. 3 illustrates an exemplary GUI 300 displaying a splash screen with a logo. In an embodiment, nutrition tracking input device 112, nutrition tracking display device 114, administrator device 116, and/or food service provider service device 118 display exemplary GUI 300 upon initializing the app.

Figure 4:
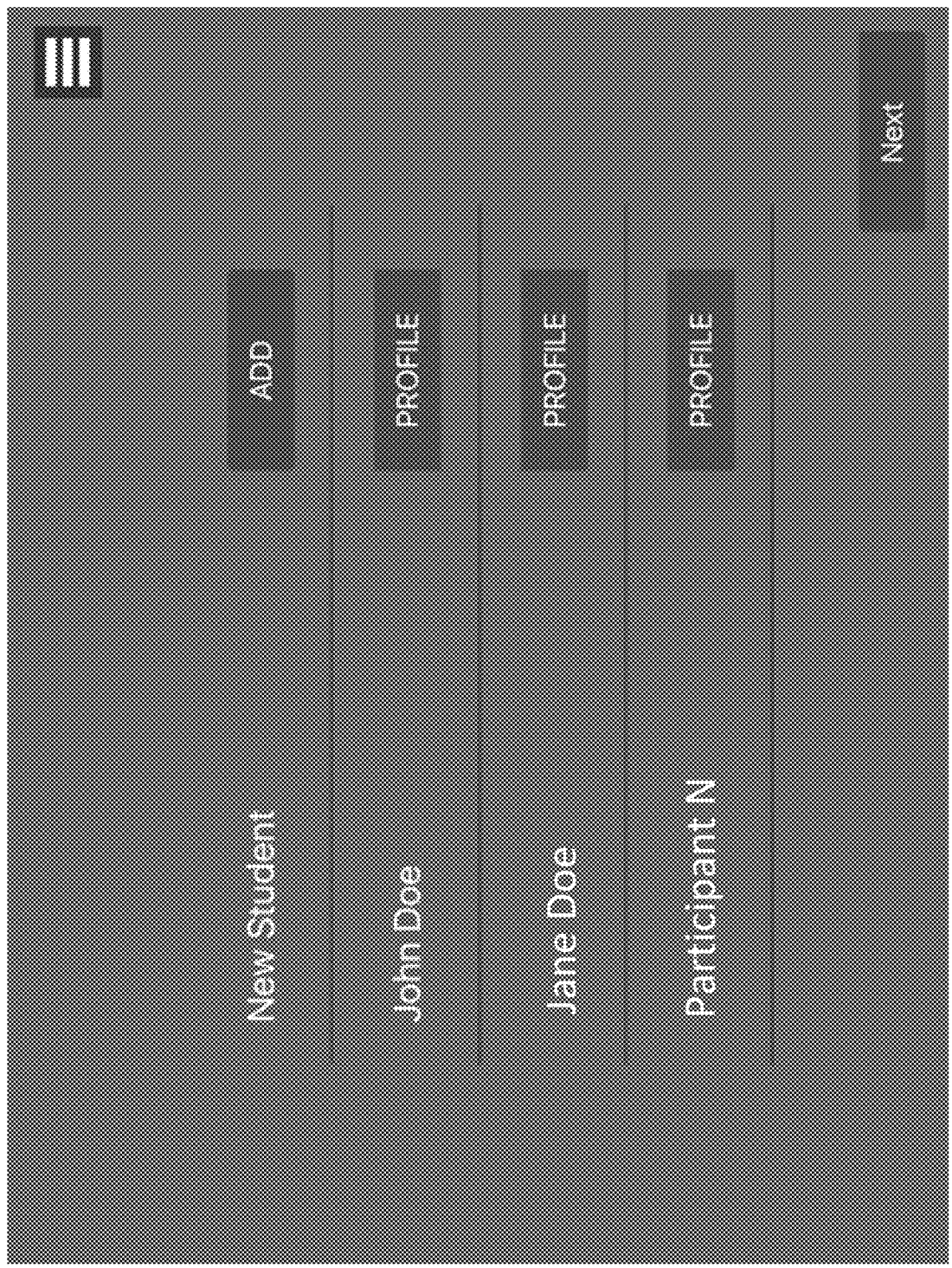
FIG. 4 illustrates an exemplary display of a participant roster displayed by a graphical user interface according to an embodiment of the invention.

FIG. 4 illustrates an exemplary GUI 400 displaying a roster screen with a roster of participants. In an embodiment, nutrition tracking input device 112, nutrition tracking display device 114, administrator device 116, and/or food service provider service device 118 display exemplary GUI 300 after displaying exemplary GUI 300. As illustrated in FIG. 4, a user may select the "ADD" button to add a new participant or the "PROFILE" button of each existing participant to view food consumption and nutrition data for that participant.

Figure 5:
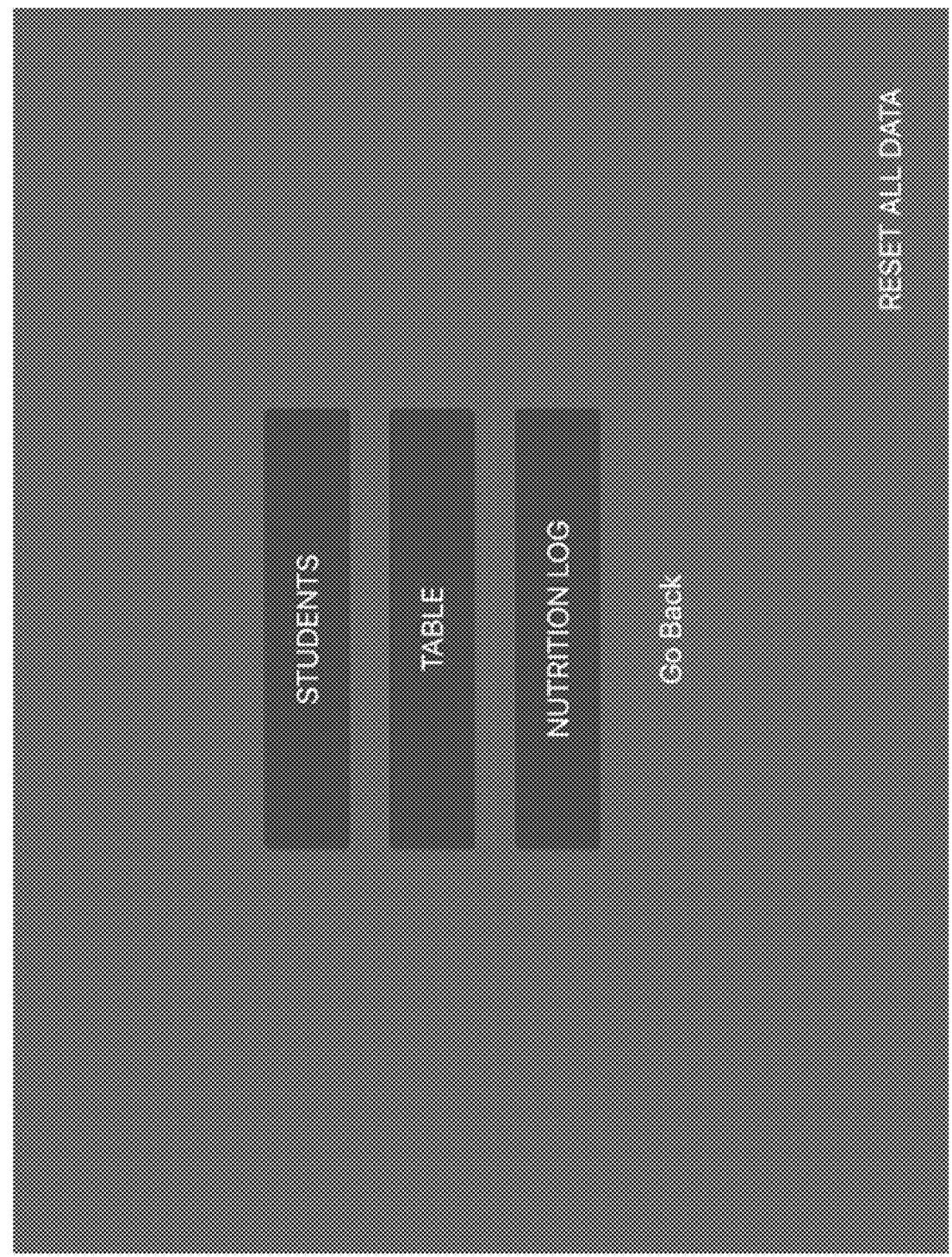
FIG. 5 illustrates an exemplary display of available actions displayed by a graphical user interface according to an embodiment of the invention.

FIG. 5 illustrates an exemplary GUI 500 displaying buttons with available actions. In an embodiment, nutrition tracking input device 112, nutrition tracking display device 114, administrator device 116, and/or food service provider service device 118 display exemplary GUI 500 after displaying exemplary GUI 400. As illustrated in FIG. 5, a user may select the "STUDENTS" button to display GUI 400, select the "TABLE" button to display GUI 900, and/or select the "NUTRITION LOG" button to display GUI 1200.

FIG. 6 illustrates an exemplary GUI 600 displaying a new participant entry screen. In an embodiment, nutrition tracking input device 112, nutrition tracking display device 114, administrator device 116, and/or food service provider service device 118 display exemplary GUI 600 after selection of the "ADD" button on GUI 400. As illustrated in FIG. 6, a user may enter a participant's name, age, email address (e.g., for a parent/guardian), and/or allergies. Upon selecting the "Add Student" button, an entry for the participant is created in database 104.

Figure 7:
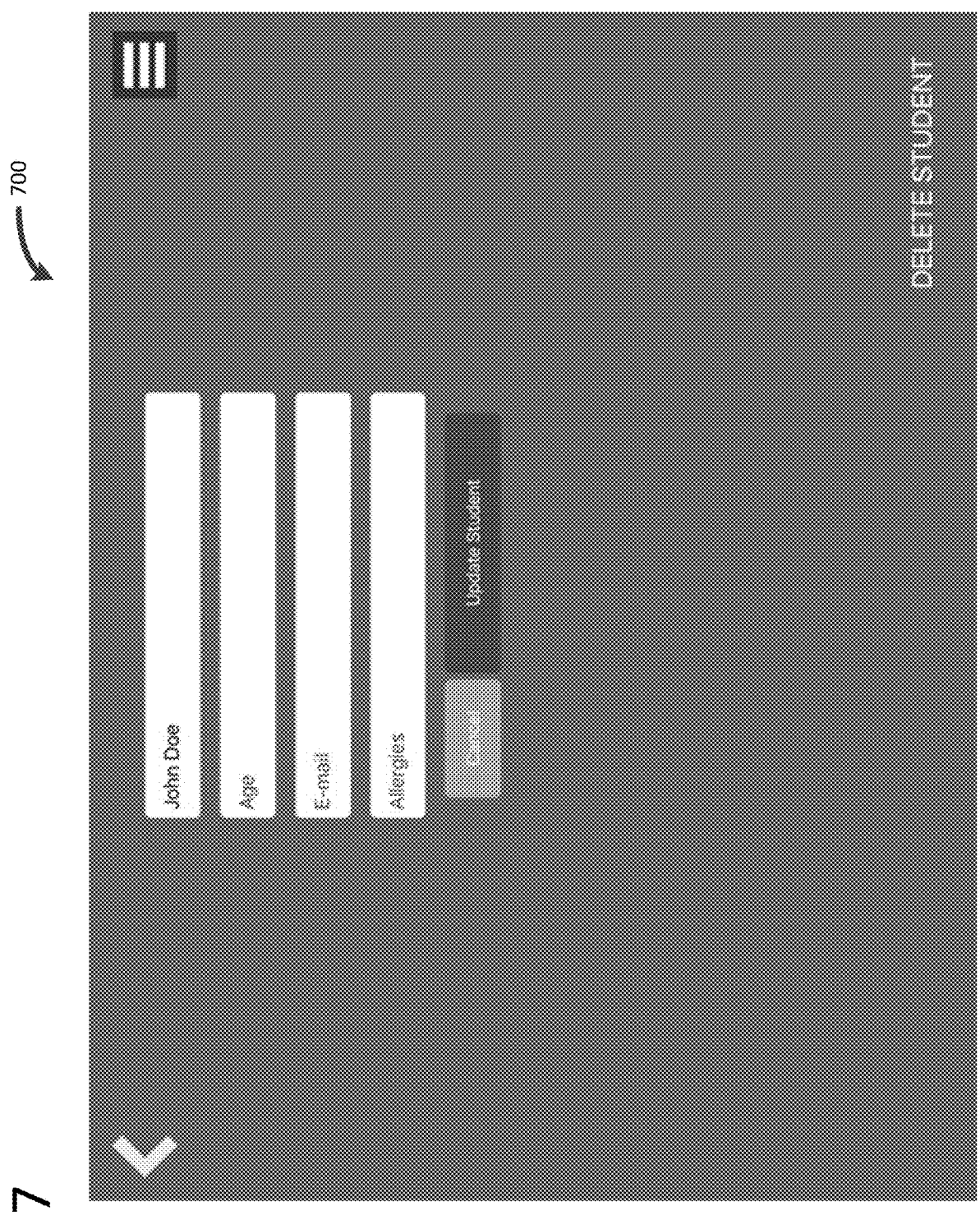
FIG. 7 illustrates an exemplary display of a participant entry update displayed by a graphical user interface according to an embodiment of the invention.

FIG. 7 illustrates an exemplary GUI 700 displaying a participant entry update screen. In an embodiment, nutrition tracking input device 112, nutrition tracking display device 114, administrator device 116, and/or food service provider service device 118 display exemplary GUI 700 after selection of the "PROFILE" button for a particular participant on GUI 400. As illustrated in FIG. 7, a user may enter and/or edit a participant's name, age, email address, and/or allergies. Upon selecting the "Update Student" button, an entry for the participant in database 104 is changed to reflect the updated participant data.

Figure 8:
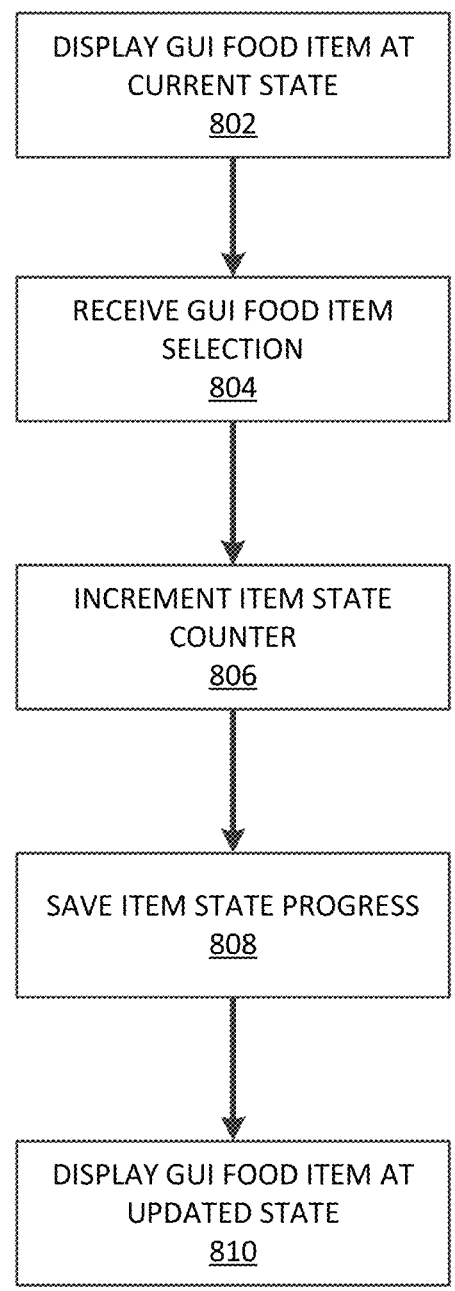
FIG. 8 illustrates an exemplary flow diagram illustrating a nutrition tracking data entry operation of the automated nutrition analytics system of FIG. 1.
Figure 9A:
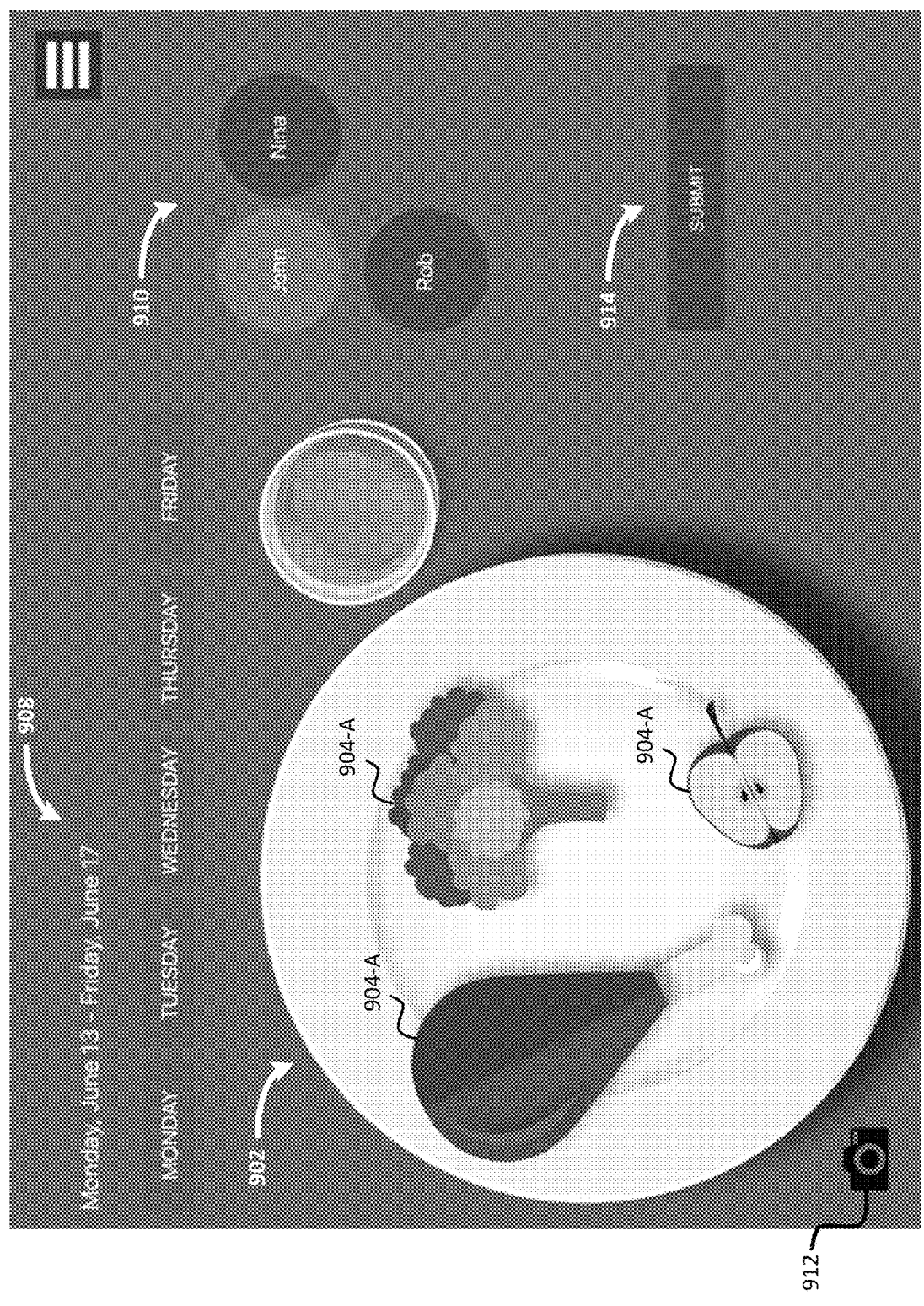
FIGS. 9A-9E illustrate exemplary displays of nutrition tracking data entry displayed by a graphical user interface according to an embodiment of the invention.

FIG. 8 illustrates an exemplary flow diagram illustrating a nutrition tracking data entry operation via a GUI of nutrition tracking input device 112. At step 802, nutrition tracking input device 112 displays a GUI food item at a current state via the GUI. For example, as shown in FIG. 9A, nutrition tracking input device 112 displays a menu, generally indicated at 902, consisting of GUI food items 904 (e.g., a chicken leg, broccoli, and an apple on a plate). The displayed GUI food items 904 correspond to actual food items served to the participant such that the displayed GUI food items 904 are representative of the actual food items. The GUI food items 904-A shown in FIG. 9A are each in a first state (e.g., ItemState=1), indicating that they are whole items and the participant has not consumed any portion of the actual food items.

Referring again to FIG. 8, nutrition tracking input device 112 receives a selection of one or more GUI food items 904 at step 804. For example, a user may tap on a displayed GUI food item 904 (e.g., the apple) using a touchscreen interface. One having ordinary skill in the art will understand that other selection mechanisms may be utilized in addition to or in place of a touchscreen interface (e.g., pointing devices, keypads, speech recognition, etc.). After receiving the food item selection, nutrition tracking input device 112 increments an item state counter for the selected GUI food item 904 at step 806. Continuing the above example, an item state counter for the selected apple is incremented (e.g., Item-State=2). At step 808 data regarding the item state, and thereby the actual food item consumption, is saved to a memory storage device of nutrition tracking input device 112 and/or database 104. At step 810 nutrition tracking input device 112 displays the GUI food item 904 having the updated state. For example, the selected apple is displayed in FIG. 9B with one quarter missing (e.g., substantially one-quarter of the actual apple has been consumed by the participant). Exemplary source code for the nutrition tracking data entry operation is provided in APPENDIX A.

Figure 9B:
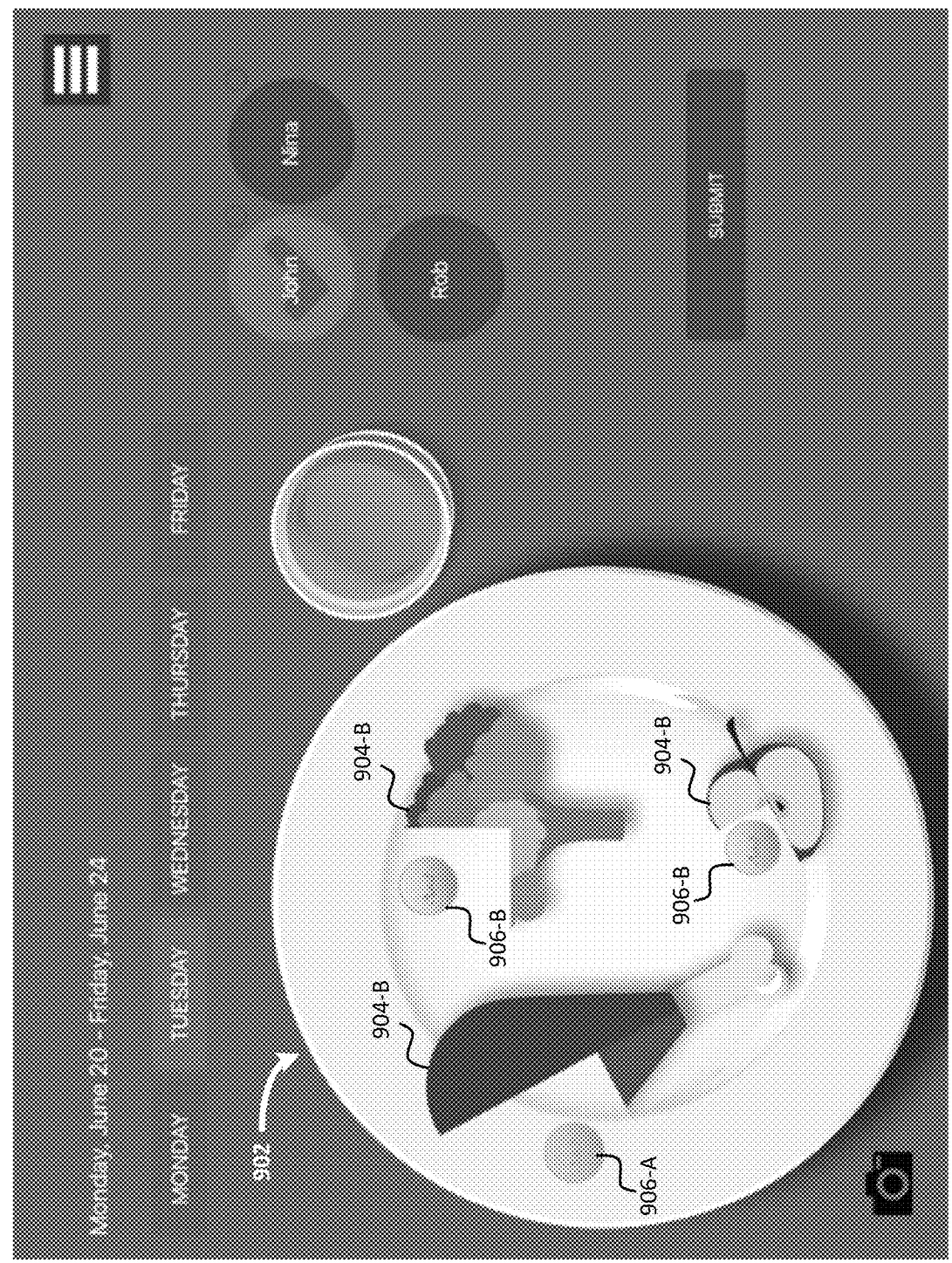

As indicated above, FIG. 9A illustrates an exemplary GUI 900 displaying a GUI menu 902 of GUI food items 904-A (e.g., a whole chicken leg, whole broccoli, a whole apple, and a whole glass of water). When a user selects a GUI food item 904-A one time (e.g., by pressing on the GUI food items 904 via a touchscreen interface), the GUI food items 904-B are displayed as three-quarters items (i.e., one quarter missing) as illustrated by FIG. 9B. As explained above, three-quarters GUI food items 904-B indicate that the participant has consumed about one-quarter of the actual food items. In an embodiment, a point indicia 906 is displayed in place of the missing quarter. The point indicia 906 may be saved to database 104 and utilized in a rewards system to promote engagement with food consumption goals. In another embodiment, the points may be worth different values depending upon the associated food item. For example, the point indicia 906-A for the chicken leg may be gray in color to signify 1 point and the point indicia 906-B for the broccoli and apple may signify 1.5 points or 2 points to indicate that consumption of broccoli and apple are valued more highly than consumption of chicken. The point indicia may be incorporated with a rewards system for participants to earn points and prizes upon completion of consumption of certain food groups. In a further embodiment, a quality indicia (not shown) may be additionally or alternatively displayed in place of the missing quarter. For example, a "thumbs-up" or "thumbs-down" indicia may be displayed. A selection of the thumbs-up indicia may indicate the participant favored the associated food item and selection of the thumbs-down indicia may indicate the participant disfavored the associated food item.

Figure 9C:
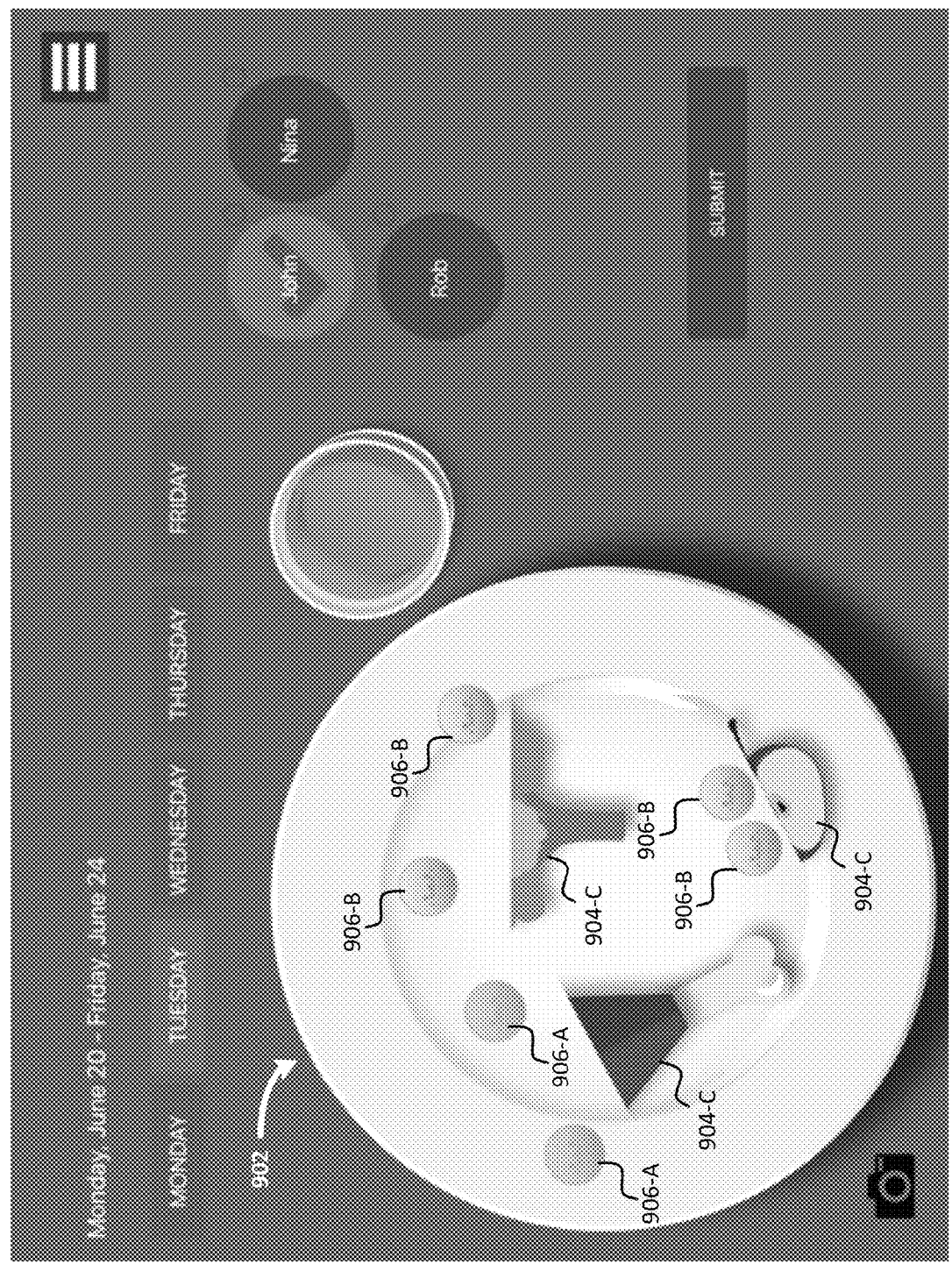
Figure 9D:
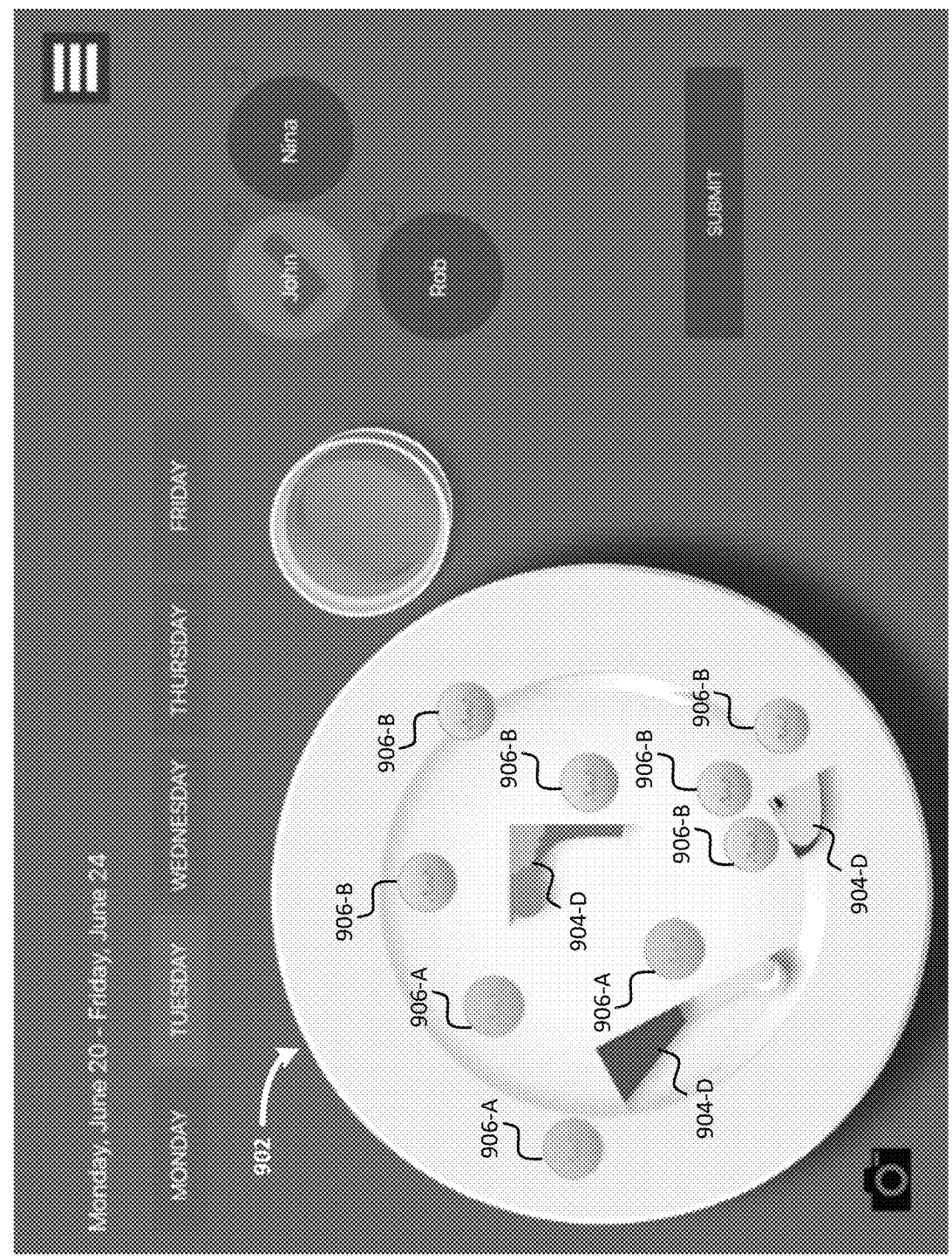
Figure 9E:
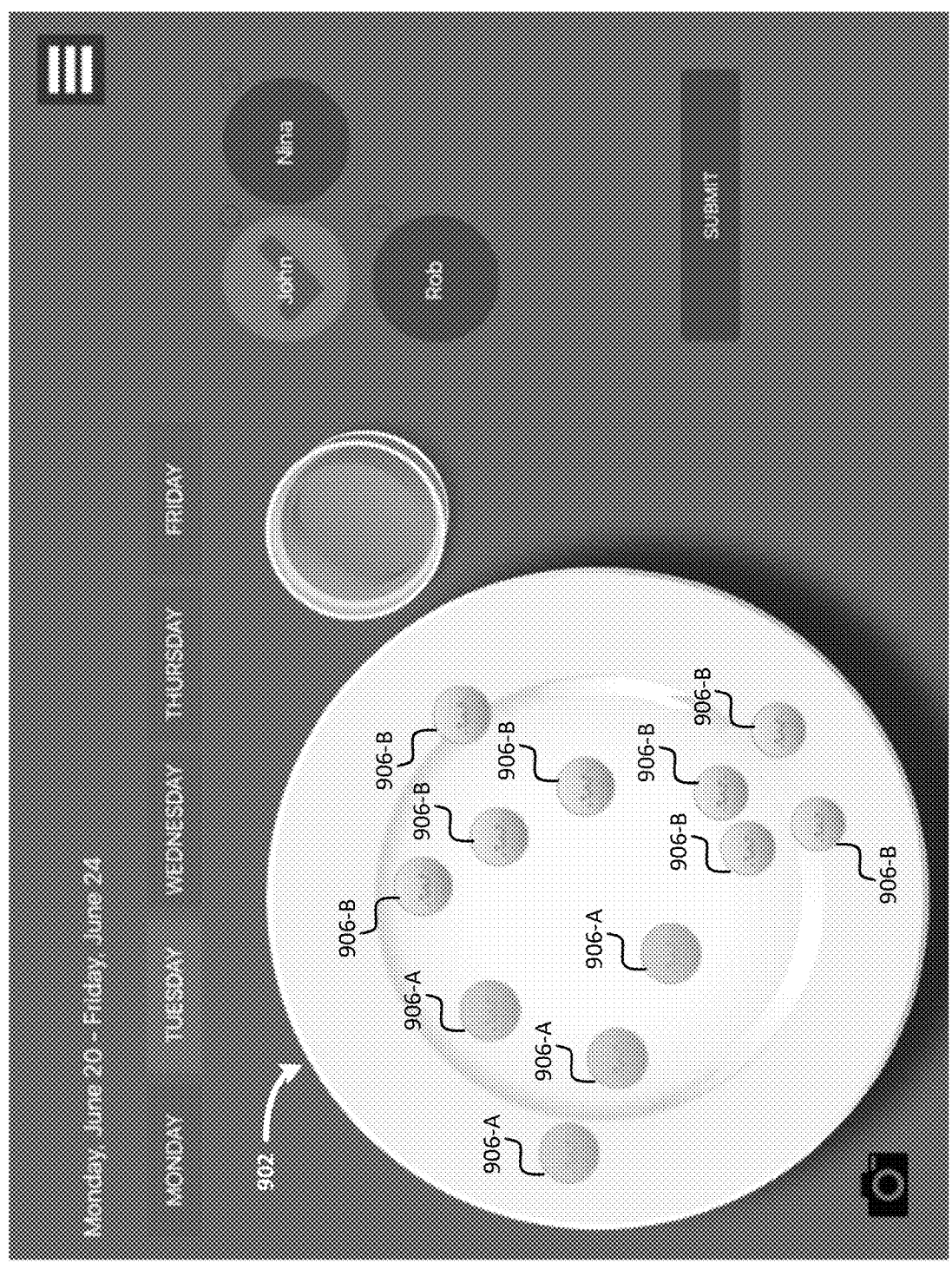

As additional portions of the actual food items are consumed by the participants, the user may select again each GUI food item 904. For example, a selection of each GUI food item 904-B results in a state update for each item (e.g., ItemState=3) and GUI food items 904-C (e.g., about half of each item) being displayed as illustrated by FIG. 9C. A selection of GUI food items 904-C results in another state update (e.g., ItemState=4) and GUI food items 904-D (e.g., about one-quarter of each item) being displayed as illustrated by FIG. 9D. The GUI food items 904-C being displayed corresponds to the participant having consumed about one-half of each actual food item and GUI food items 904-D being displayed corresponds to the participant having consumed about three-quarters of each actual food item. A selection of GUI food items 904-D results in a further state update (e.g., ItemState=5) and the food items not being displayed at all, as illustrated by FIG. 9E, which indicates the participant has consumed about the entire portion of each actual food item. Although illustrated as chicken, broccoli, and an apple, one having ordinary skill in the art will understand that other GUI food items may be illustrated on GUI 900 to correspond to actual food items served to and consumed by participants.

As further illustrated by FIG. 9A, the GUI includes date indicia 908, participant indicia 910, a camera indicia 912, and a submission indicia 914. In an embodiment, date indicia 908 include selectable days of the week. Selecting a past date results in GUI menu 902 displaying food items 904 indicative of the selected participant's (910) food consumption on that date. Accordingly, aspects of the invention provide a food journal/diary. Selection of the camera indicia 912 enables a user to take a photograph of actual food items consumed by a participant using a camera of the computing device. The photograph may also be of the participant consuming the actual food items. The photograph may then be uploaded to database 104 for later retrieval and/or inclusion with a report generated by report generator 108. Selection of the submission indicia 914 instructs the app to save the state counter data for each GUI food item 904 to a memory storage device (e.g., a memory storage device of the computing device and/or database 104).

Figure 10:
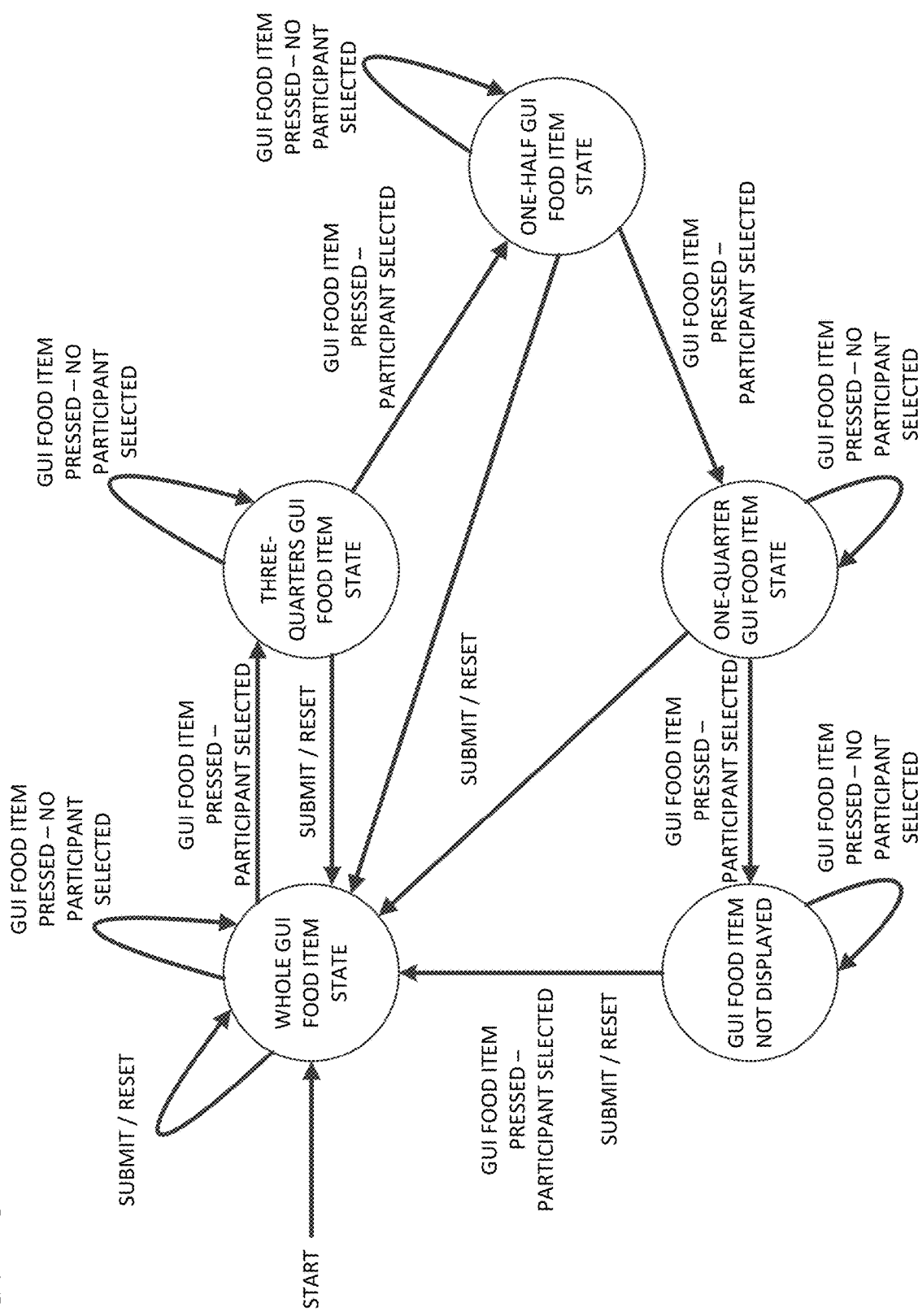
FIG. 10 illustrates an exemplary state diagram of graphical user interface food items of FIGS. 9A-9E.

FIG. 10 illustrates an exemplary state diagram for GUI food items 904. As illustrated, each GUI food item 904 is initially in a whole GUI food item state (e.g., FIG. 9A). When a GUI food item 904 is in the whole GUI food item state and a submit (e.g., submit indicia 914) command is entered, a reset command is entered, or the GUI food item 904 is pressed without a participant selected (e.g., participant indicia 910), the GUI food item 904 remains in the whole GUI food item state. When a GUI food item 904 is in the whole GUI food item state and is pressed while a participant is selected (e.g., participant indicia 910), the GUI food item 904 transitions to a three-quarters GUI food item state.

When a GUI food item 904 is in the three-quarters GUI food item state (e.g., FIG. 9B) and a submit command or a reset command is entered, the GUI food item 904 transitions to the whole GUI food item state. When a GUI food item 904 is in the three-quarters GUI food item state and is pressed without a participant selected, the GUI food item 904 remains in the three-quarters GUI food item state. When a GUI food item 904 is in the three-quarters GUI food item state and is pressed while a participant is selected, the GUI food item 904 transitions to a one-half GUI food item state.

When a GUI food item 904 is in the one-half GUI food item state (e.g., FIG. 9C) and a submit command or a reset command is entered, the GUI food item 904 transitions to the whole GUI food item state. When a GUI food item 904 is in the one-half GUI food item state and is pressed without a participant selected, the GUI food item 904 remains in the one-half GUI food item state. When a GUI food item 904 is in the one-half GUI food item state and is pressed while a participant is selected, the GUI food item 904 transitions to a one-quarter GUI food item state.

When a GUI food item 904 is in the one-quarter GUI food item state (e.g., FIG. 9D) and a submit command or a reset command is entered, the GUI food item 904 transitions to the whole GUI food item state. When a GUI food item 904 is in the one-quarter GUI food item state and is pressed without a participant selected, the GUI food item 904 remains in the one-quarter GUI food item state. When a GUI food item 904 is in the one-quarter GUI food item state and is pressed while a participant is selected, the GUI food item 904 transitions to a state in which the GUI food item is not displayed.

When a GUI food item 904 is in the not displayed GUI food item state (e.g., FIG. 9E) and a submit command is entered, a reset command is entered, or the area in which the GUI food item 904 was displayed is pressed while a participant selected, the GUI food item 904 transitions to the whole GUI food item state. When a GUI food item 904 is in the not displayed GUI food item state and the area in which it was displayed is pressed without a participant selected, the GUI food item 904 remains in the not displayed GUI food item state.

In an embodiment, GUI food items 904 in accordance with an aspect of the invention provide closed-form visual food item consumption data entry. Although GUI food items 904 have been illustrated and described herein as divided into quadrants, one having ordinary skill in the art will understand that other divisions are within the scope of the invention (e.g., halves, thirds, octants, etc.).

Figure 11:
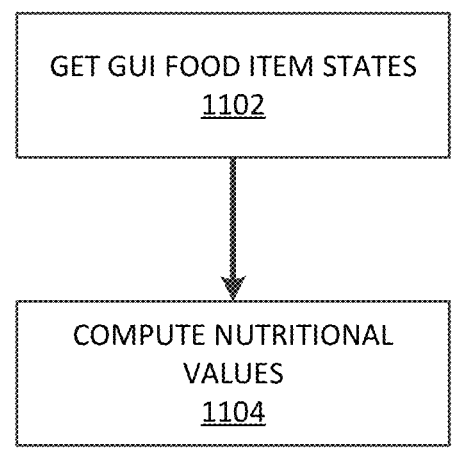
FIG. 11 illustrates an exemplary flow diagram illustrating a nutrition analytics operation of the automated nutrition analytics system of FIG. 1.
Figure 12:
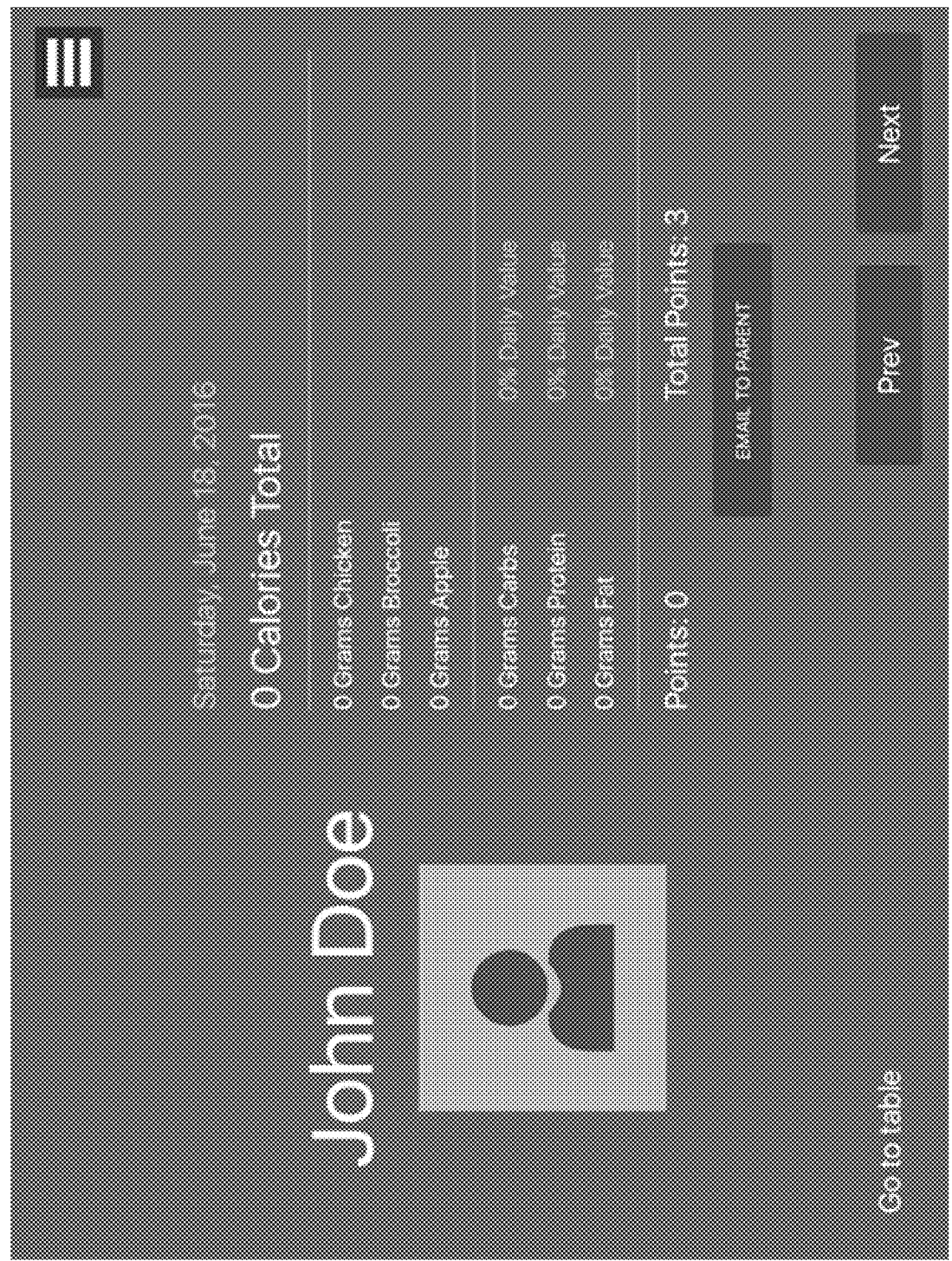
FIG. 12 illustrates an exemplary display of nutrition analytics displayed by a graphical user interface according to an embodiment of the invention.

FIG. 11 illustrates an exemplary flow diagram illustrating a nutrition analytics operation of analytics service 106. Analytics service 106 gets the states of GUI food items 904 at step 1102 and computes the nutritional values for the consumed portion of the actual food items at step 1104. For example, if a student John Doe consumed half of each of a chicken portion, a broccoli portion, and an apple portion (e.g., FIG. 9C), analytics service 106 would get the item states of each (e.g., ItemState=3) and compute the nutritional values for a half serving of each. In other words, if the entire apple portion has 80 calories total, 20 grams of carbohydrates, 1 gram of fat, and 1 gram of protein then analytics service 106 would compute that John Doe consumed 40 calories total, 10 grams of carbohydrates, 0.5 grams of fat, and 0.5 grams of protein. These values would then be stored in database 104 for John Doe for that particular day and could be accessed by nutrition tracking input device 112, nutrition tracking display device 114, administrator device 116, and/or food service provider service device 118 via communications network 110 and displayed via an exemplary nutritional log GUI 1200 (FIG. 12). These values may also be included in a report generated by report generator 108 and transmitted to nutrition tracking input device 112, nutrition tracking display device 114, administrator device 116, and/or food service provider service device 118 via communications network 110.

Figure 13A:
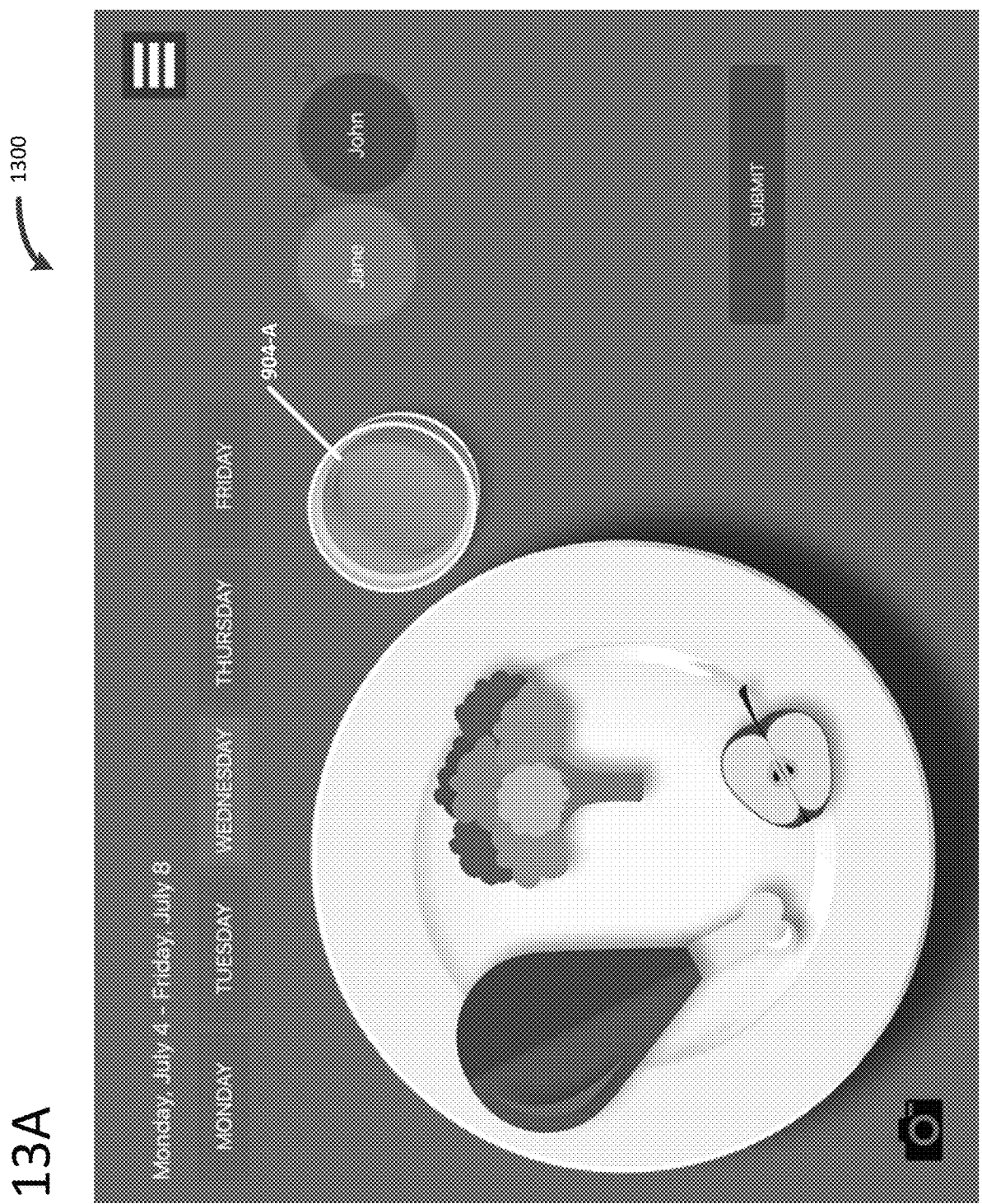
Figure 13B:
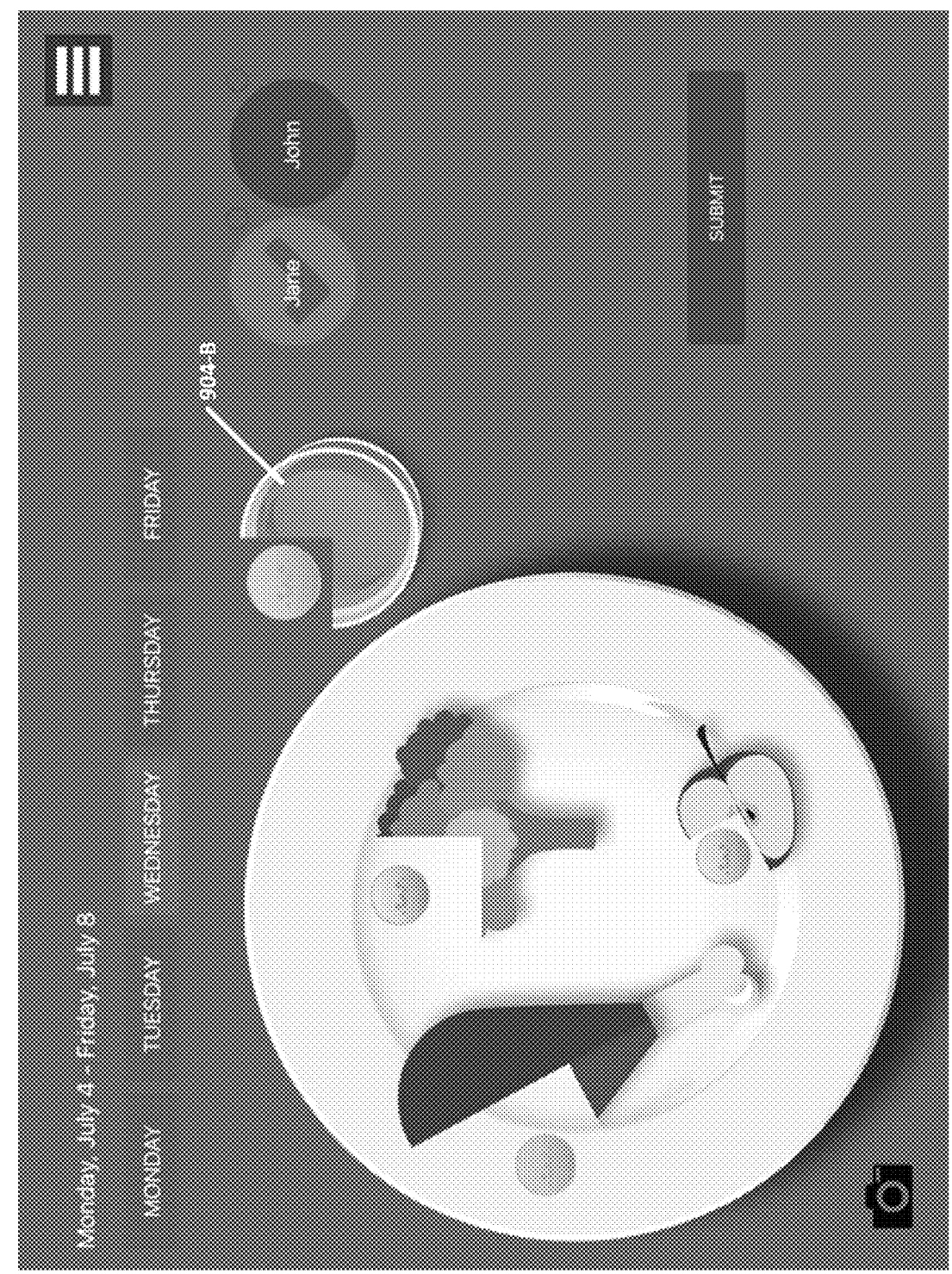
Figure 13C:
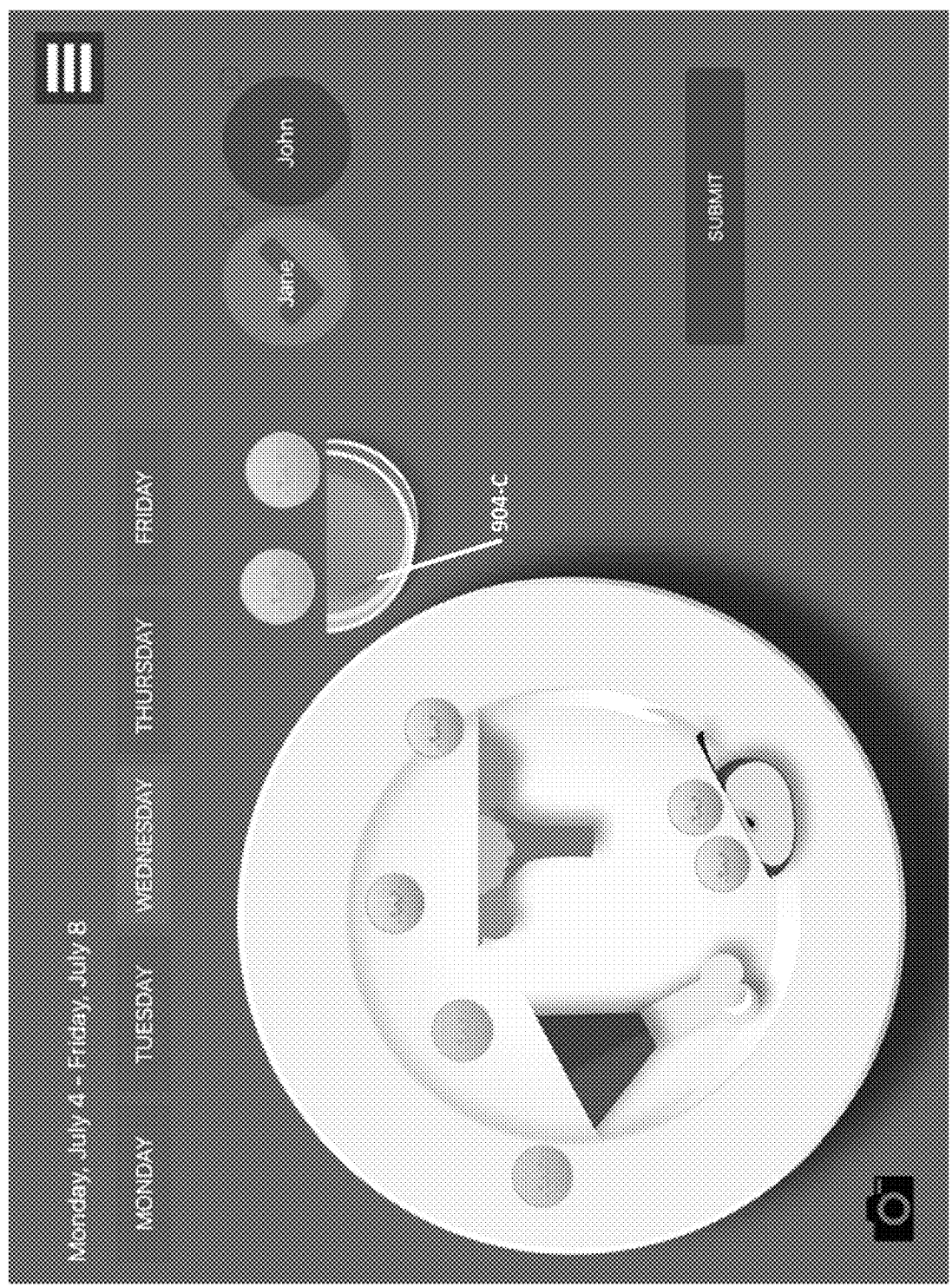
Figure 13E:
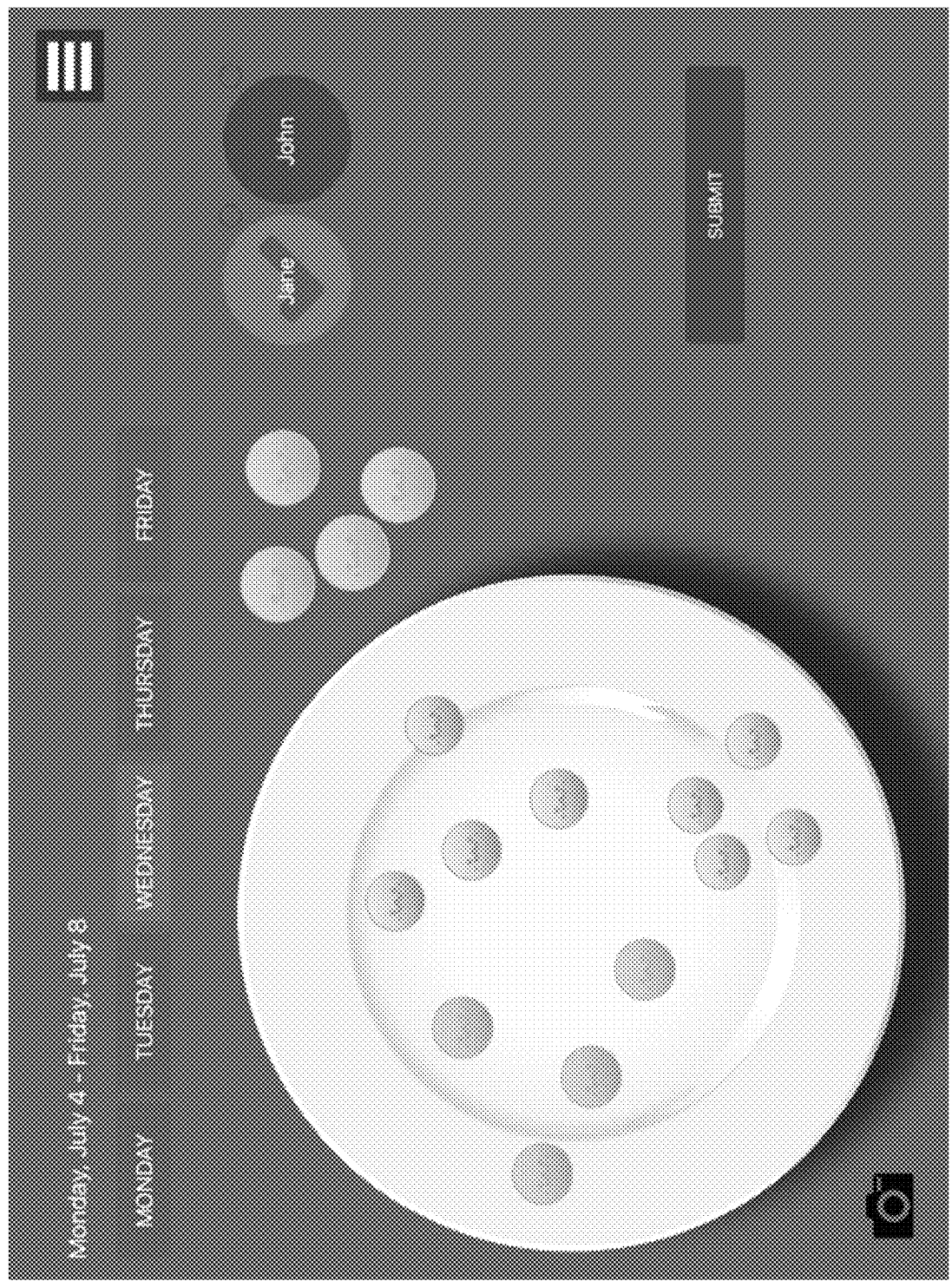

FIGS. 13A-13E illustrate an exemplary GUI 1300 displaying a GUI menu of GUI food items 904 including a GUI beverage item. In an embodiment, the GUI beverage item comprises a GUI food item 904. When a user selects GUI beverage item 904-A one time (e.g., by pressing on the GUI beverage item 904-A via a touchscreen interface), the GUI beverage item 904-B is displayed as a three-quarters item (i.e., one quarter missing) as illustrated by FIG. 13B. As explained above, three-quarters GUI beverage item 904-B indicates that the participant has consumed about one-quarter of the actual beverage item. Exemplary beverage items include, but are not limited to, water, milk, juice, and the like. In an embodiment, a point indicia 906 described herein is displayed in place of missing quarters of GUI beverage item 904-B. As additional portions of the actual beverage item are consumed by the participant, the user may select again the GUI beverage item 904-B. Selections of GUI beverage item 904 result in state updates for the item as further described herein. FIG. 13C illustrates GUI beverage item 904-C (e.g., about half) and FIG. 13D illustrates GUI beverage item 904-D (e.g., about one quarter). FIG. 13E illustrates the GUI beverage item 904 not being displayed at all, which indicates the participant has consumed about the entire portion of the actual beverage item.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

```
void OnMenuItem1Pressed(object sender, EventArgs e)
{
    if(currentStudent = = null) {
        return;
    }
    // Increment Meal State
    menuItem1State++;
    if(menuItem1State > 4) {
        menuItem1State = 0;
    }
    // Save
    currentMeal.MenuItem1Progress = menuItem1State;
    SaveMeal( );
    // Update Image
    UpdateDisplayMenuItem(1, sender);
}
void UpdateDisplayMenuItem(int index, object sender = null) {
    string image = "";
    int currentState = 0;
    if(index == 1) {
        currentState = menuItem1State;
        if(menuItem1State == 1) {
            image = "meal_chicken_1.png";
        } else if(menuItem1State == 2) {
            image = "meal_chicken_2.png";
        } else if(menuItem1State == 3) {
            image = "meal_chicken_3.png";
        } else if(menuItem1State == 4) {
            image = "meal_chicken_4.png";
        } else {
            image = "meal_chicken.png";
        }
        menuItem1.Image = image;
        menuItem1.IsVisible = true;
    } else if(index == 2) {
        currentState = menuItem2State;
        if(menuItem2State == 1) {
            image = "meal_broccoli_1.png";
        } else if(menuItem2State == 2) {
            image = "meal_broccoli_2.png";
        } else if(menuItem2State == 3) {
            image = "meal_broccoli_3.png";
```

-continued

```
        } else if(menuItem2State == 4) {
            image = "meal_broccoli_4.png";
        } else {
            image = "meal_broccoli.png";
        }
        menuItem2.Image = image;
        menuItem2.IsVisible = true;
    } else if(index == 3) {
        currentState = menuItem3State;
        if(menuItem3State == 1) {
            image = "meal_apple_1.png";
        } else if(menuItem3State == 2) {
            image = "meal_apple_2.png";
        } else if(menuItem3State == 3) {
            image = "meal_apple_3.png";
        } else if(menuItem3State == 4) {
            image = "meal_apple_4.png";
        } else {
            image = "meal_apple.png";
        }
        menuItem3.Image = image;
        menuItem3.IsVisible = true;
    }
    if(sender != null && currentState > 0) {
        PlaySoundCoinDrop(sender);
    }
    CheckMealProgress( );
}
```

What is claimed is:

1. A method comprising:

receiving, by a computing device, a predetermined menu for a participant including a plurality of food items from a server computing device via a communications network;

displaying, via a graphical user interface of a computing device, a plurality of graphical indicias each corresponding to one of the plurality food items, with a first graphical indicia of one food item of the plurality of food items corresponding to a first state of the one food item indicating that the one food item is a single whole food item and has not been consumed, and the first graphical indicia of the one food item corresponding to an item state counter having a first value for the one food item stored in a memory device of the computing device;

receiving, by the computing device via the graphical user interface, at least one user selections on the first graphical indicia of the one food item;

in response to the at least one user selections:

decrementing, by the computing device, the item state counter for the one food item stored in the memory device from the first value to a second value by a predetermined fraction unit of the whole food item with every user selection, the second value being a partial value of the first value, and the second value corresponding to a second graphical indicia of the one food item, with the second graphical indicia indicating that at least a fraction of the one food item has not been consumed by the participant;

storing, by the computing device in the memory device, data corresponding to the second value to indicate the one food item has been consumed by the participant from the first state thereof to the second state thereof;

displaying, via the graphical user interface of the computing device, the second graphical indicia of the one food item; and displaying, via the graphical user interface, a quality indicia near the second graphical indicia of the one food item, to indicate the participant favored or disfavored the food item.

2. The method of claim 1, further comprising transmitting, by the computing device via a communications network to a server computing device, the data corresponding to the second value to indicate the one food item has been transformed via consumption from the first state thereof to the second state thereof.

3. The method of claim 2, further comprising analyzing, by an analytics service executing on the server computing device, the transmitted data to determine one or more nutritional values corresponding to the transformation of the one food item via consumption.

4. The method of claim 3, further comprising generating, by a report generator executing on the server computing device, a report comprising the determined nutritional values.

5. The method of claim 4, further comprising transmitting, by the server computing device, the generated report to a second computing device, wherein said transmission causes the second computing device to display the report on a graphical user interface thereof.

6. A method comprising:
receiving, by a computing device, a predetermined menu for a participant including a plurality of food items from a server computing device via a communications network;
displaying, via a graphical user interface of a computing device, a plurality of graphical indicias each corresponding to one of the plurality food items, with a first graphical indicia of one food item of the plurality of food items corresponding to a first state of the one food item indicating that the one food item is a single whole food item and has not been consumed, and the first graphical indicia of the one food item corresponding to an item state counter having a first value for the one food item stored in a memory device of the computing device;
receiving, by the computing device via the graphical user interface, at least one user selections on the first graphical indicia of the one food item;
in response to the at least one user selections:
decrementing, by the computing device, the item state counter for the one food item stored in the memory device from the first value to a second value by a predetermined fraction unit of the whole food item with every user selection, the second value being a partial value of the first value, and the second value corresponding to a second graphical indicia of the one food item, with the second graphical indicia indicating that at least a fraction of the one food item has not been consumed by the participant;
storing, by the computing device in the memory device, data corresponding to the second value to indicate the one food item has been consumed by the participant from the first state thereof to the second state thereof;
displaying, via the graphical user interface of the computing device, the second graphical indicia of the one food item; and
displaying, via the graphical user interface, a reward graphical indicia near the second graphical indicia of the one food item, wherein the reward is incorporated with a rewards system for the participant to promote engagement with food consumption goals.

7. The method of claim 6, further comprising emitting, via a speaker of the computing device, a reward audible indicia corresponding to the reward graphical indicia.

8. The method of claim 6, further comprising transmitting, by the computing device via a communications network to a server computing device, the data corresponding to the second value to indicate the one food item has been transformed via consumption from the first state thereof to the second state thereof.

9. The method of claim 8, further comprising analyzing, by an analytics service executing on the server computing device, the transmitted data to determine one or more nutritional values corresponding to the transformation of the one food item via consumption.

10. The method of claim 9, further comprising generating, by a report generator executing on the server computing device, a report comprising the determined nutritional values.

11. The method of claim 10, further comprising transmitting, by the server computing device, the generated report to a second computing device, wherein said transmission causes the second computing device to display the report on a graphical user interface thereof.

* * * * *